United States Patent [19]

Kayakabe et al.

[11] Patent Number: 4,611,702

[45] Date of Patent: Sep. 16, 1986

[54] CLUTCH COVER

[75] Inventors: Nobuhiro Kayakabe; Isamu Sasaki, both of Toyota, Japan

[73] Assignee: Aisin Seiki Kabushiki Kaisha, Kariya, Japan

[21] Appl. No.: 642,163

[22] Filed: Aug. 20, 1984

[30] Foreign Application Priority Data

Aug. 19, 1983 [JP] Japan .......................... 58-129131[U]

[51] Int. Cl.$^4$ ............................................. F16D 13/75
[52] U.S. Cl. ............................... 192/110 R; 74/573 R
[58] Field of Search ................. 192/30 R, 110 R, 115; 29/163.5; 73/460; 52/100; 74/573 R; 403/371

[56] References Cited

U.S. PATENT DOCUMENTS 2,328,421  8/1943  Carlson et al. ............... 248/DIG. 9
3,838,464  9/1974  Doyle ............................... 74/573 X Primary Examiner—George H. Krizmanich
Attorney, Agent, or Firm—Oblon, Fisher, Spivak, McClelland & Maier

[57] ABSTRACT

A clutch cover for use in a clutch assembly wherein a plurality of balance adjusting portions are provided at a periphery of a flange, and the balance adjusting portions are press-formed as bosses or connected to the main body of the clutch cover with deep grooves so that an imbalance of the clutch can be easily corrected or reduced on production line of clutch by removing certain balance adjusting portions.

12 Claims, 18 Drawing Figures 231  232

233  234

235  236  237

21  22  22a  224  225  226

241  242  243  244  245  246

101  2

102  2

103  104  2

P  105  2  106

107  108  2

CLUTCH COVER

BACKGROUND OF THE INVENTION

1. Field of the Invention

The present invention is directed to a clutch cover having a plurality of balance adjusting portions.

2. Discussion of the Background

A conventional diaphragm spring-type clutch assembly for an automotive vehicle includes an engine driven flywheel, a clutch cover secured to the flywheel, an axially reciprocable pressure plate held within the clutch cover and rotatable with the cover and flywheel, a clutch plate positioned between and adapted to be squeezed by the flywheel and pressure plate, a pivotal lever disposed outside of the cover for moving the pressure plate axially relative to the cover into and out of engagement with the clutch plate and a diaphragm spring pivotally mounted on the cover and compressed between the cover and the lever. The clutch cover is rotated with the flywheel. Thus, the clutch cover, and more particularly the whole clutch cover assembly including the cover, the pressure plate and the diaphragm spring, should be balanced relative to the rotational axis thereof. However, during the fabrication of the parts and/or the assembly thereof an imbalance is formed. In order to correct or reduce the imbalance of the clutch cover assembly, the weight and direction of imbalance are measured by an imbalance tester, and then a certain balance weight is fixed to or taken out of a certain peripheral portion of the clutch cover.

3. Description of the Prior Art

As methods for balance correction of a clutch or a clutch assembly, conventionally, methods as shown in FIGS. 14, 15 and 16 have been employed to thereby correct imbalance of the clutch at the final assembly process thereof.

(1) A predetermined peripheral portion of a clutch cover 2 as shown in FIG. 14 is caulked with a specified metal piece 101. (i.e. the piece caulking method)

(2) A predetermined peripheral portion of a clutch cover 2 as shown in FIG. 15 is welded with a metal piece 102. (i.e. the piece welding method)

(3) Holes 103 and 104 are made in a clutch cover 2 as shown in FIG. 16 at predetermined peripheral portions thereof by using a punch or a drill. i.e. the drilling method)

In these conventional clutch balance correction methods, according to the piece caulking method (1), caulking holes for pieces are suitably provided at predetermined portions of the outer periphery of the clutch cover and when the clutch is not in balance, one or more pieces have to be inserted into the caulking holes to be caulked to thereby attain balance. This caulking method requires an associated cost for the piece and it also involves a difficulty in carrying out automatic caulking to the clutch on the automatic assembly line of clutch.

According to the piece welding method (2), a predetermined-sized piece is welded at the lower portion of the outer periphery of the clutch cover. In this case, the cost of the piece is not neglected and automation thereof on the production line of clutch is also difficult.

The drilling method (3) is shown in FIGS. 17 and 18 in more detail. According to this method, a hole is made in the clutch cover 2 by means of a punch 105 and die 106 or a drill 107. In the case of punching, a punching force P of about 3 tons is required for a steel plate having a thickness of 3.2 mm. Therefore, the clutch cover 2 results in deformation due to such a large punching force P. To the contrary, in the case of drilling, chips 108 are produced and it is difficult to clear away the produced chips in the aftertreatment. Moreover, a long machining time is required for this method.

SUMMARY OF THE INVENTION

The primary object of the present invention is to facilitate correction of imbalance of a clutch or a clutch assembly.

Another object of the present invention is to provide a clutch cover of which the clutch imbalance is easily corrected on the production line of the clutch.

BRIEF DISCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 7:
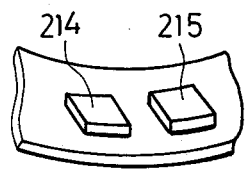
Figure 8:
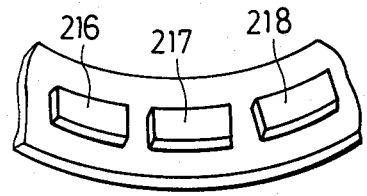
Figure 9:
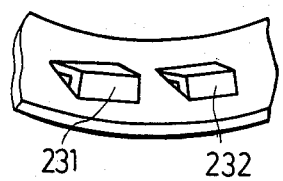
Figure 10:
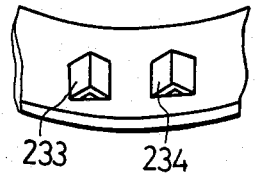
Figure 11:
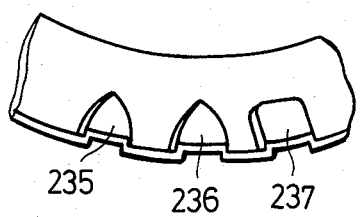

FIGS. 7, 8, 9, 10, 11 and 12 show various configurations of balance adjusting portions as modifications of the present device, wherein FIG. 7 is a perspective view showing square balance adjusting portions formed along the periphery of a flange of a clutch cover, FIG. 8 is a perspective view showing rectangular balance adjusting portions, FIG. 9 is a perspective view showing balance adjusting portions which are projected in the shape of a gable roof and are lined along the periphery of a flange of a clutch cover, FIG. 10 is another perspective view showing balance adjusting portions which are projected in the shape of a gable roof gablet and the lengthwise direction thereof is perpendicular to the periphery of the flange, FIG. 11 is another perspective view showing fan-shaped and square shaped balance adjusting portions formed along the very edge of the flange, and bosses lined from the edge to the center of the flange.

Figure 12:
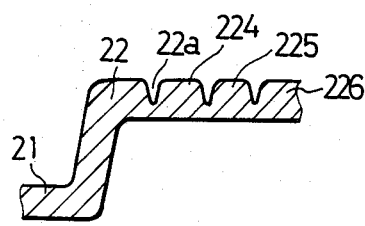

FIG. 12 is an explanatory views showing another example of a clutch cover in which a plurality of deep grooves are formed to shape balance adjusting portions.

Figure 13:
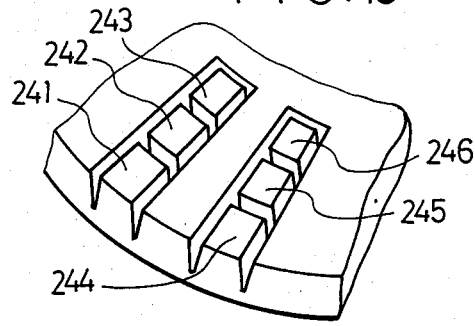

FIG. 13 is a perspective view showing square bosses lined from the edge to the center of the flange.

Figure 14:
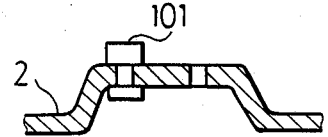
Figure 15:
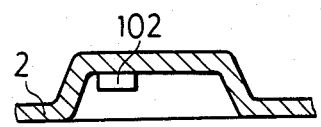
Figure 16:
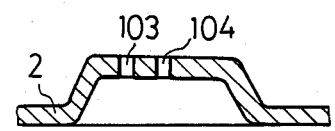

FIGS. 14, 15 and 16 are explanatory views showing conventional methods of balance correction, wherein FIG. 14 is a partial cross-sectional view of a clutch cover caulked with a balance adjusting piece, FIG. 15 is a partial cross-sectional view of a clutch cover welded with a balance adjusting piece and FIG. 16 is a partial cross-sectional view of a clutch cover with two drilled holes.

Figure 17:
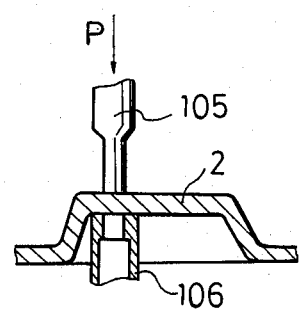
Figure 18:
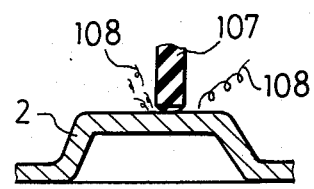

FIGS. 17 and 18 are views for explaining the conventional drilling method, wherein FIG. 17 is a view for explaining the method using a punch and FIG. 18 is a view for explaining the method using a dill.

DETAILED DESCRIPTION OF THE INVENTION

The present invention comprehends the provision of a novel clutch cover for an automotive clutch. The clutch cover has a plurality of balance adjusting portions at the outer periphery thereof. Each of the balance adjusting portions is connected to the main body of the clutch cover with a thin walled neck portion so that the balance adjusting portions are easily taken out of the main body of the clutch cover.

The balance adjusting portions are preferably distributed all along the outer periphery of the clutch cover. More particularly, the balance adjusting portions should be distributed on at least three periphral portions of the clutch cover, which are axially symmetrical, respectively. Each of the three peripheral portions should include several balance adjusting portions.

Usually, a clutch cover has a flange at its outer periphery in order to be secured to a flywheel. the flange is fixed on the flywheel with not less than three bolts or the like distributed in axial symmetry. The balance adjusting portions may be formed on parts of the flange, which are between the neighboring two securing parts. It is preferable that the flange parts having the balance adjusting portions may be axially projecting in order to form spaces between the flywheel and the flange.

The balance adjusting portions may be press-formed at the same time as the clutch cover is press-formed. More particularly, the balance adjusting portions are formed by bosses, partial notching or with surrounding grooves. The shape of the balance adjusting portions can be a circle, a triangle, a square, a fan shape and the like. Each of the balance adjusting portions may be projected from the outer surface of the clutch cover. The optimum weight of each of the balance adjusting portions is dependent on the size of a clutch cover, but generally is from one to dozens of grams.

To balance a clutch cover assembly having the clutch cover of the present invention, the direction and weight of an imbalance of the clutch cover assembly are determined as follows. Firstly, the clutch cover assembly is checked by an imbalance tester to determine the direction and weight of the imbalance. Then one or more balance adjusting portions equivalent to the imbalance weight in the certain direction are mechanically taken out of the clutch cover. Accordingly, the imbalance of the clutch cover or the clutch cover assembly is corrected or reduced. The balance adjusting portions are mechanically removed by such tools as a punching machine or a cutting plyer.

The present device can perform the particular effects as described below.

(1) It is not necessary to use pieces of balance weight for balance correction as used in the conventional methods.

(2) Imbalanced portions can be removed with a small punching force, resulting in no deformation of a clutch cover. Therefore, there is no influence on efficiency of the clutch.

(3) Since the formation of half blanking bosses on a clutch cover can be carried out at the same time as the conventional press-forming process of the clutch cover, the clutch cover of this device can be obtained economically.

(4) The correction of the imbalance of a clutch cover can be carried out relatively easily on the production line of clutch.

DESCRIPTION OF THE PREFERRED EMBODIMENTS

Figure 1:
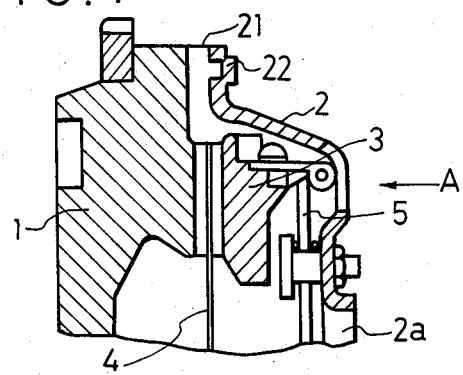
FIG. 1 is a partial fragmentary cross-sectional view of a diaphragm spring-type clutch assembly of the embodiment of the present invention.

Referring more particularly to the disclosure in the drawing wherein is shown an illustrative embodiment of the present invention, FIG. 1 discloses a cross sectional view of a vehicle clutch assembly including a flywheel 1, a clutch cover 2 secured to the flywheel 1, an axially reciprocable pressure plate 3 held within the clutch cover 2 and being rotatable with the flywheel 1 and the cover 2, a clutch plate 4 positioned between and adapted to be squeezed by the flywheel 1 and the pressure plate 3, a pivotal lever (not shown) disposed outside of the cover 2 for moving the pressure plate 3 axially relative to the cover 2 into and out of engagement with the clutch plate 4 and a diaphragm spring 5 pivotally mounted on the cover 2 and compressed between the cover 2 and the lever (not shown).

Figure 2:
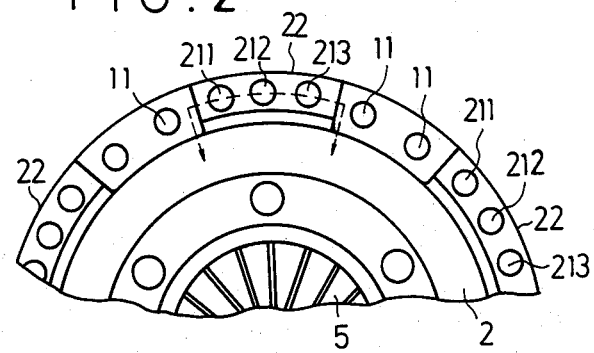
FIG. 2 is a partial view of a clutch assembly taken in the direction of A in FIG. 1.
Figure 4:
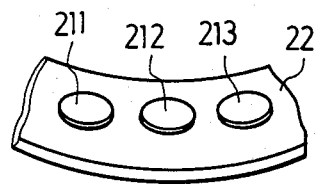
FIG. 4 is a perspective view showing the balance adjusting portions or bosses of FIG. 3.
Figure 3:
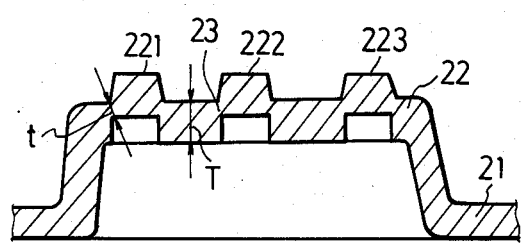
FIG. 3 is a fragmentary sectional view taken along line V—V in FIG. 2 for showing a plurality of balance adjusting portions in the cover.

The clutch cover 2 has a shape of a saucer with a large center hole 2a and a flange 21 at its outer periphery. The flange 21 has several projecting portions 22 formed in axial symmetry at certain intervals. Each of the projecting portions has three balance adjusting portions 221, 222 and 223 lined along the peripheral edge of the flange 21 as shown in FIG. 2. The balance adjusting portions or bosses 221, 222 and 223 are formed as half blanking bosses shown in FIG. 3, which is a sectional view taken along line V—V in FIG. 2. In this case, the thickness T of the retreating portion 22 is about 3.2 mm and the thickness t of the thin walled neck portion 23 connecting the retreating portion 22 and the balance adjusting portion 221 is about 1.0 mm. And the balance adjusting portions are press-formed at the same time as the clutch, and one balance adjusting portion weighs about 2 g.

In this clutch, the other components except the clutch cover 2, such as the pressure plate 3, the clutch plate 4 and the diaphragm spring 5 are the same as the conventional ones.

Figure 5:
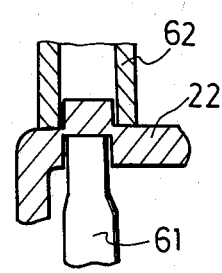
FIG. 5 is a view for explaining the process of removing a balance adjusting portion from a clutch cover by means of punching.
Figure 6:
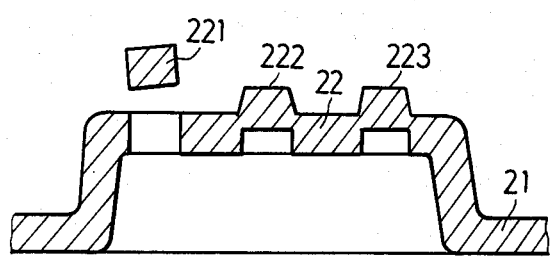
FIG. 6 shows a cross sectional view of a clutch cover out of which a balance adjusting portion is being taken.

Next, the clutch cover 2 is assembled with the diaphragm spring 5 and pressure plate 3, and then subjected to an imbalance tester (not shown) to determine the direction and weight of the imbalance. Then the balance adjusting portions 221, 222 and 223 equivalent to the determined weight in the determined direction are removed with a punch 61 and a die 62, as shown in FIG. 5. FIG. 6 shows the flange portions 22 after punching a portion 221. After that, the clutch cover assembly is fixed on the flywheel 1 with bolts 11.

In this embodiment, the balance adjusting portions formed as half blanking bosses are connected with the flange portions of the clutch cover 2 by the thin walled neck portion of 1 mm in thickness. Therefore, punching the balance adjusting portions with a punch 61 and a die 62 are remarkably easy and do not cause such an inconvenience that the clutch cover 2 is deformed by punching pressure. The balance adjusting portions 221, 222 and 223 in this embodiment are formed on the projecting portions of the flange portions 22, but the balance adjusting portions can be directly formed on the flange without forming any retreating portions.

The balance adjusing portions can be shaped into square as shown in 214 and 215 of FIG. 7 or into rectangle as shown in 216, 217 and 218 of FIG. 8. As shown in FIGS. 9 and 10, the balance adjusting portions 231, 232, 233 and 234 can be also projected in the shape of a gable roof. The gable roof is composed of two inclined parts 231a and 231b. The two inclined parts 231a and 231b are joined to form a roof top edge 231c. The ridgeline 231c may be parallel to the ridgeline of the flange as shown in FIG. 9 or may be perpendicular to the ridgeline of the flange as shown in FIG. 10. Each of the outer sides of the inclined portions 231a and 231b are connected to the flange with a thin walled portion. Further, as FIG. 11 shows, the balance adjusting portions 235, 236 and 237 can be lined along the very edge of the flange. Both of the balance adjusting portions 235 and 236 have a shape of a fan and the balance adjusting portion 237 has a shape of a square. Furthermore, grooves 22a can be used to form the thin portion which connects the balance adjusting portions 224, 225 and 226 to the retreating portion 22 as shown in FIG. 12. Or, as FIG. 13 shows, the balance adjusting portions 241, 242, 243, 244, 245 and 246 are continuously formed in line from the edge to the center of the flange.

Obviously, numerous modifications and variations of the present invention are possible in light of the above teachings. It is therefore to be understood that within the scope of the appended claims, the invention may be practiced otherwise than as specifically described herein.

What is claimed is:

1. A clutch cover to be secured to a flywheel of a vehicle engine and to be assembled with at least one pressure plate, comprising:
   a plurality of press-formed balance adjusting portions provided at a peripheral portion of the clutch cover, each of said balance adjusting portions being connected to a main body of said clutch cover via a thin walled neck portion having a thickness less than that of said cover.

2. A clutch cover according to claim 1, wherein said clutch cover has a flange portion and wherein said balance adjusting portions are formed in said flange portion of said clutch cover.

3. A clutch cover according to claim 2, wherein said flange has several portions in axial symmetry at certain intervals and said balance adjusting portions are provided at said flange portions.

4. A clutch cover according to claim 2, wherein at least some of said balance adjusting portions are arranged in the circumferential direction of said clutch cover.

5. A clutch cover according to claim 1, wherein the shape of at least one of said balance adjusting portions is a circle.

6. A clutch cover according to claim 1, wherein the shape of at least one of said balance adjusting portions is a square.

7. A clutch cover according to claim 1, wherein the shape of at least one of said balance adjusting portions is of a fan shape.

8. A clutch cover according to claim 1, wherein the shape of at least one of said balance adjusting portions is of a gable roof shape.

9. A clutch cover according to claim 8, wherein the top roof line of said gable roof shape is parallel to the circumferential direction of said clutch cover.

10. A clutch cover according to claim 8, wherein the top roof line of said gable roof shape is perpendicular to the circumferential direction of said clutch cover.

11. A clutch cover to be secured to a flywheel of a vehicle engine and to be assembled with at least one pressure plate, comprising:
    a plurality of balance adjusting portions provided at a peripheral portion of said clutch cover, each of said balance adjusting portions being connected to a main body of said clutch cover via a grooved thin walled neck portion.

12. A clutch cover according to claim 11, wherein said balance adjusting portions are arranged in a line and are interconnected by said thin walled neck portion.

* * * * *